United States Patent [19]

Suzuki et al.

[11] Patent Number: 4,953,088
[45] Date of Patent: Aug. 28, 1990

[54] SENTENCE TRANSLATOR WITH PROCESSING STAGE INDICATOR

[75] Inventors: Hitoshi Suzuki; Shinobu Shiotani; Shinji Tokunaga, all of Nara; Tokuyuki Hirai, Yamatokoriyama; Yoji Fukumochi, Nara; Shuzo Kugimiya, Nara; Ichiko Sata, Nara, all of Japan

[73] Assignee: Sharp Kabushiki Kaisha, Osaka, Japan

[21] Appl. No.: 372,133

[22] Filed: Jun. 26, 1989

Related U.S. Application Data

[63] Continuation of Ser. No. 113,121, Oct. 27, 1987, abandoned.

[30] Foreign Application Priority Data

Oct. 27, 1986 [JP] Japan .................. 61-256077
Oct. 27, 1986 [JP] Japan .................. 61-256078
Oct. 27, 1986 [JP] Japan .................. 61-256079
Nov. 28, 1986 [JP] Japan .................. 61-284486

[51] Int. Cl.⁵ .............................................. G06F 15/38
[52] U.S. Cl. ............................................... 364/419
[58] Field of Search ............... 364/419, 200 MS File, 364/900 MS File

[56] References Cited

U.S. PATENT DOCUMENTS 4,774,666 9/1988 Miyao et al. .............. 364/419
4,805,132 2/1989 Okamoto et al. .............. 364/900
4,814,988 3/1989 Shiotani et al. .............. 364/419
4,894,779 1/1990 Hitoshi et al. .............. 364/419

FOREIGN PATENT DOCUMENTS 0180888 5/1986 European Pat. Off. .
0201096 11/1986 European Pat. Off. .
0213905 3/1987 European Pat. Off. .
0230340 7/1987 European Pat. Off. .
0205878 4/1986 Japan .
0255468 11/1986 Japan .
0049472 3/1987 Japan .
2175718 12/1986 United Kingdom .

OTHER PUBLICATIONS

Atari's GEM Operating System "Diskcopy" Procedure, 1985.
Webster's New World Spelling Checker, Sep. 1986.

Primary Examiner—Clark A. Jablon

[57] ABSTRACT

A translation apparatus is provided for translating a sentence from an original language into a sentence of a target language. The translation apparatus has a computer which analyzes the original language sentence, and generates the target language sentence based on the analyzed original language sentence. During the translation, indicators are displayed on a screen for indicating that the analysis of the original language sentence is taking place, and other indicators are displayed for indicating that the generation of the target language sentence is taking place. These indicators will help the operator to know that the translation apparatus is properly operating for obtaining a translation result, particularly when the translation process is taking a long time.

7 Claims, 7 Drawing Sheets

SENTENCE TRANSLATOR WITH PROCESSING STAGE INDICATOR

This application is a continuation, of application Ser. No. 07/113,121 filed on Oct. 27, 1987, now abandoned.

BACKGROUND OF THE INVENTION

1. Field of the Invention

The embodiments of the present invention relate to a translation system and, more particularly, to a language translation apparatus which translates from one language (original language) to another language (target language) by the use of a computer.

2. Description of the Prior Art

Figure 1:
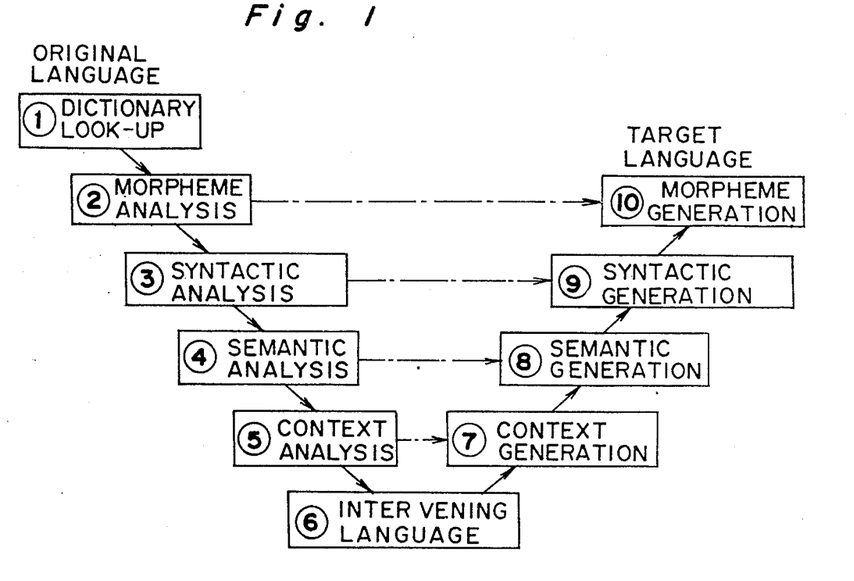
FIG. 1 is a diagram view showing the processes which translate from one language to another language.

A general description of how the computer translation from one language to another language is carried out be explained. As shown in FIG. 1, a sentence of the original or source language is processed so that a word-to-word dictionary look-up is obtained. Next, the source language is analyzed in various steps, which include a: morpheme analysis, a syntactic analysis, a semantic analysis, and a context analysis in order to obtain an intervening language which does not belong to any existing language, but the intervening language is understood only by the computer. The steps carried out in each analysis will be further understood from Table 1 which is shown below.

TABLE 1

| Analysis Steps | Analysis |
| --- | --- |
| Dictionary look-up and morpheme analysis | Find a word in a dictionary and provide its translation as well as other word information, such as verb, noun, adverb, adjective, plural, singular, tense, person, etc, according to the stored grammar text. |
| Syntactic analysis | Find a relationship between the words, clauses and/or phrases to determined one or more possible sentence contructions, each analyzed in a form of a tree structure. |
| Semantic analysis | Select one sentence construction which is most appropriate from the viewpoint of the sentence meaning. |
| Context analysis | Understanding the theme of the sentence and the clarifying the vague expressions. |

After the intervening language is obtained, the computer forms and generates a sentence in the target language through the steps of: context generation; semantic generation; syntactic generation; and morpheme generation, which is similar to the above described analysis.

The above described method of the computer translation is called a pivot method. The pivot method follows the steps formulated by the solid line arrows shown in FIG. 1 in order to obtain the intervening language and before finally obtaining the target language.

Another translation method is called a transfer method. The transfer method takes a short cut in the steps which are formulated by one of the chain line arrows in order to complete the translation without obtaining the intervening language.

There have been a number of translation apparatuses proposed which can translate an original language, sentence by sentence, into a target language so that the translated result will be displayed on a screen by the point or transfer method.

A problem in the prior art translation apparatuses is that when the translation is carried out, no indication of the translation process is produced. Therefore, the operator cannot be certain whether the apparatus is really proceeding with the translation, or the apparatus has made an error and has stopped the translation. Although the translation time depends on the hardware, the software and the length and the complexity of the sentence to be translated, a translation procedure by a computer for one sentence usually takes from several seconds to several tens of minutes. Therefore, the operator may feel apprehensive about the state of the translation process, particularly when the apparatus is taking a long time to complete the translation of one sentence.

The same problem is encountered when the translation of a number of sentences are carried out. In this case, the operator is not certain of which sentence is being processed by the translation method.

SUMMARY OF THE INVENTION

The embodiments of the present invention have been developed with a view for substantially solving the above described disadvantages and have for its essential object to provide an improved translation apparatus which can indicate the translation steps being carried out in the computer.

In accomplishing these and other objects, a translation apparatus for translating a sentence of an original language into a sentence of a target language includes a device for analyzing the original language sentence, a device for generating the target language sentence based on the analyzed original language sentence, an original language analysis indicator for indicating that the analysis of the original language sentence is taking place, and a target language generation indicator for indicating that the generation of the target language sentence is taking place.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, in which.

DETAILED DESCRIPTION OF THE PREFERRED EMBODIMENT

Figure 2:
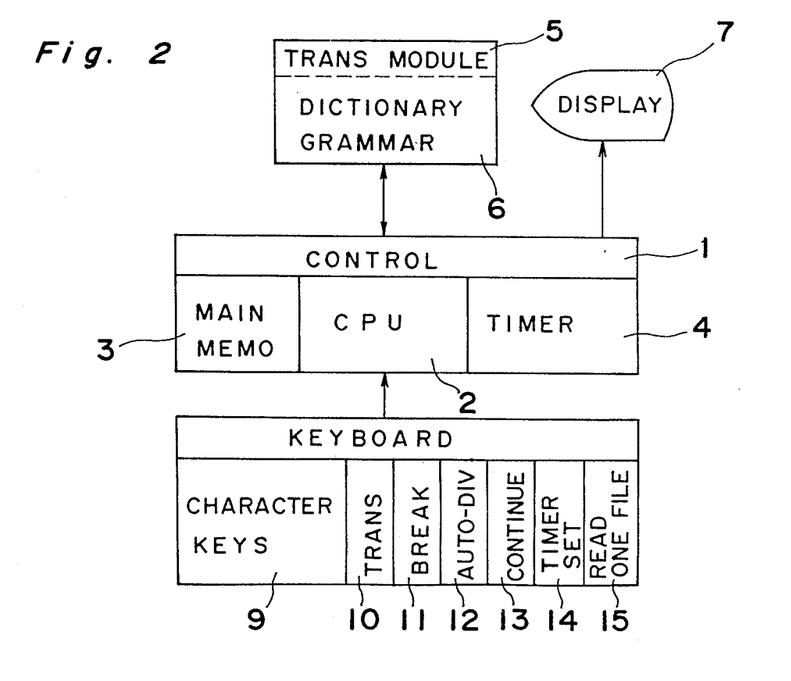
FIG. 2 is a block diagram of a translation apparatus according to preferred embodiment of the present invention.

Referring to FIG. 2, a block diagram for a language translation apparatus according to a preferred embodiment of the present invention is shown. The apparatus performs a translation from one language (original language), such as English, to another language (target language), such Japanese, as by the use of a computer. The translation apparatus includes a control unit 1 defined by a central processing unit (CPU) 2, a main memory 3 and a timer circuit 4. The CPU 2 is provided for carrying out the translation, and the main memory 3 is provided for storing programs to be used in the CPU. The timer circuit 4 has a timer for counting a maximum time T and a counter for counting up to ten. The counter is incremented by "1" after the timer has counted a time of T/10.

Furthermore, a translation module 5 is provided for storing information necessary for carrying the translation and a table 6 carrying words and the translation and grammatical information thereof for use in a dictionary and grammar text. A display 7 is provided for showing the translation result as well as the intermediate processes taken during the translation, as will be described later.

A keyboard 8 is provided for inputting necessary information. The keyboard 8 has character keys 9 for inputting alphanumerical letters, a translation command key 10, a break key 11, an auto-division command key 12, a continue key 13, a timer setting key 14 for setting the maximum time T and a read one file key 15.

According to the embodiment disclosed herein, the translation is carried out by the transfer method, as explained above in connection with FIG. 1 and the analysis proceeds as far as the syntactic analysis. Instead, it is possible to use the pivot method or the transfer method with the analysis being capable to proceed up to different levels.

Also, according to the present embodiment, the translation, more particularly the process 52 for analyzing the syntax, i.e., the sentence construction, is carried out either under a basic mode or under an auto-division mode. The syntactic analysis under the auto-division mode is established when the auto-division command key is depressed or when the computer determines that the analysis under the auto-division mode is preferred, as will be described later in connection with FIG. 8. Under the basic mode, the syntactic analysis is carried out on a whole sentence analysis basis, which means that the analysis is carried out one sentence at a time. Under the auto-division mode, the analysis is carried out on a section of one sentence at a time. The syntactic analysis under the auto-division mode is suitable for very long sentences. The detail of the translation done under the auto-division mode is disclosed in U.S. patent application Ser. No. 66,549, filed June 26, 1987, which is assigned to the same assignee as the present application.

Figure 3:
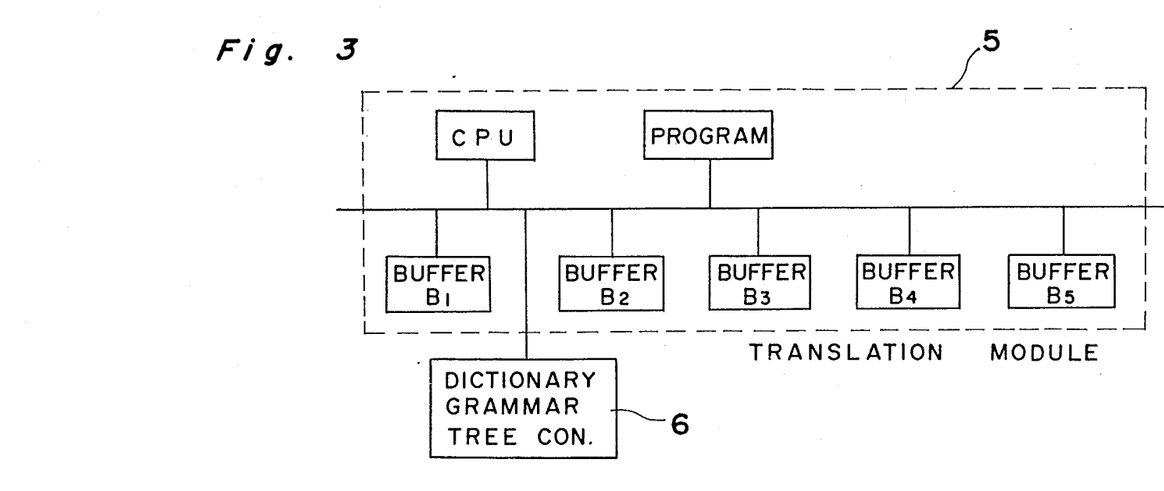
FIG. 3 is a block diagram showing a detail of the translation module shown in FIG. 2.

Referring to FIG. 3, a hardware structure of the translation module 5 is shown which includes five buffers B1, B2, B3, B4 and B5, a CPU and a program memory. The five buffers are provided for storing the analysis results in the different levels.

Figure 4:
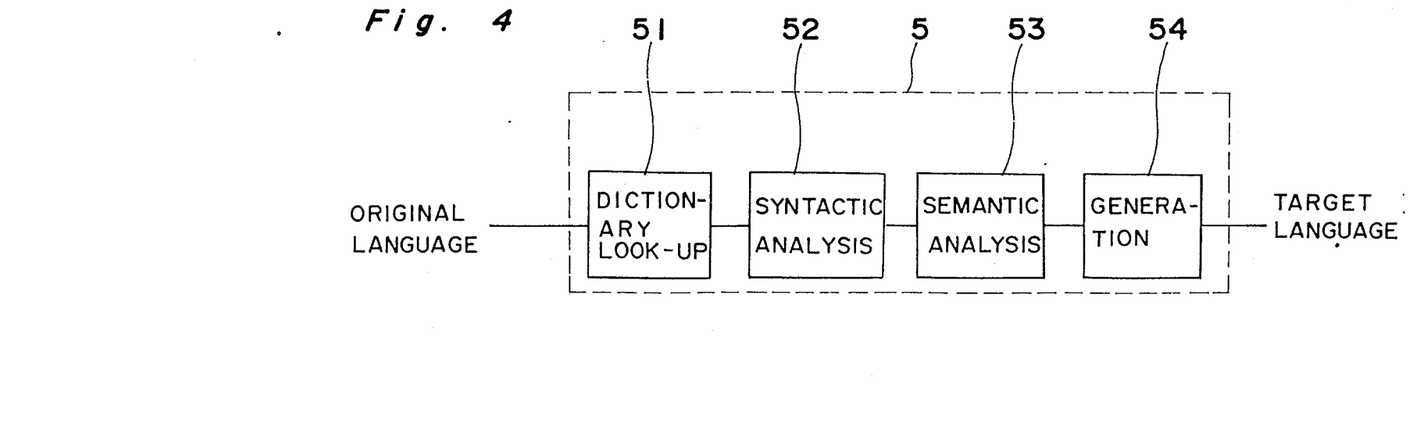
FIG. 4 is a block diagram showing the translation processes employed in the preferred embodiment of the present invention.

Referring to FIG. 4, a software structure of the translation module 5 is shown which includes: a dictionary look-up process 51 for obtaining information for each word using a dictionary stored in the memory upon receipt of the original language (English) sentence, a syntactic analysis process 52 for analyzing the sentence in a tree structure, a semantic analysis process 53 for analyzing the meaning of the sentence and a sentence generation process 54 for generating a sentence in the target language (Japanese).

Figure 5A:
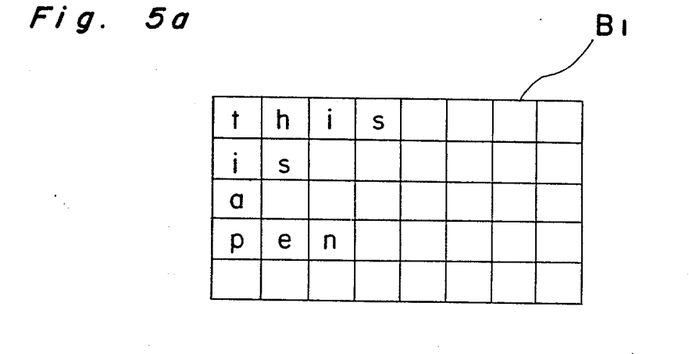
FIGS. 5a to 5e are diagrams which show the data to be stored in the buffers that are shown in FIG. 3.
Figure 5B:
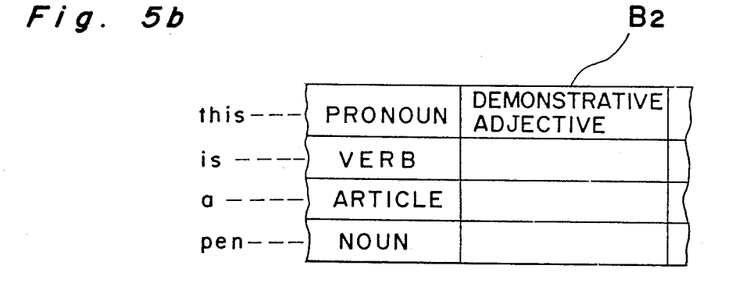
Figure 5C:
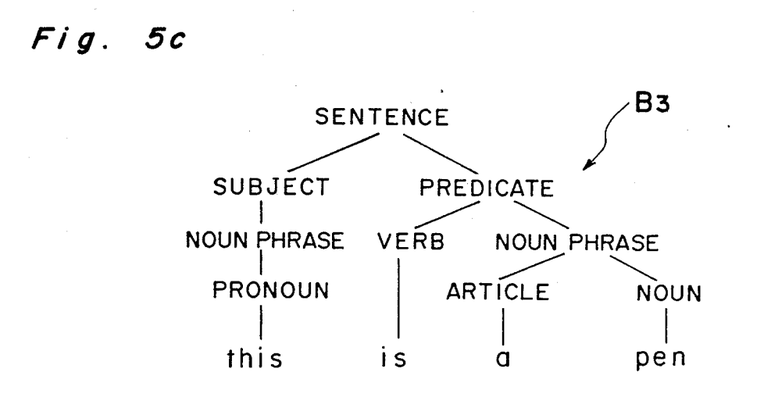

In an example, it is now assumed that an English sentence "This is a pen" is inputted into the apparatus. Buffers B1 and B2 are used for the dictionary look-up process 51. In buffer B1, the sentence is separated into words and the words are sequentially stored in different areas, as shown in FIG. 5a. Then, in buffer B2, each original word is provided with various word information utilizing a dictionary and grammar text stored in the apparatus. An example of the data stored in buffer B2 is shown in FIG. 5b. Although the word "this" can be either an adjective, a pronoun, or an adverb, this is determined to be a pronoun by the syntactic analysis process 52. Thus, buffer B3, which is used for process 52, stores the sentence in association with a tree construction analysis. To obtain the tree structure of FIG. 5c, an analysis as shown in Table 2 below is carried out with the necessary information derived from table 6 (FIG. 3) for carrying words and the translation and grammatical information.

TABLE 2

| UNIT | ELEMENTS DEFINING THE UNIT |
| --- | --- |
| Sentence | Subject and Predicate |
| Subject | Noun phrase |
| Predicate | Verb and Noun phrase |
| Noun phrase | Pronoun |
| Noun phrase | Article and Noun |

By the above table, each unit can be analyzed in elements. For example, a sentence can be analyzed into a subject and a predicate.

Figure 5D:
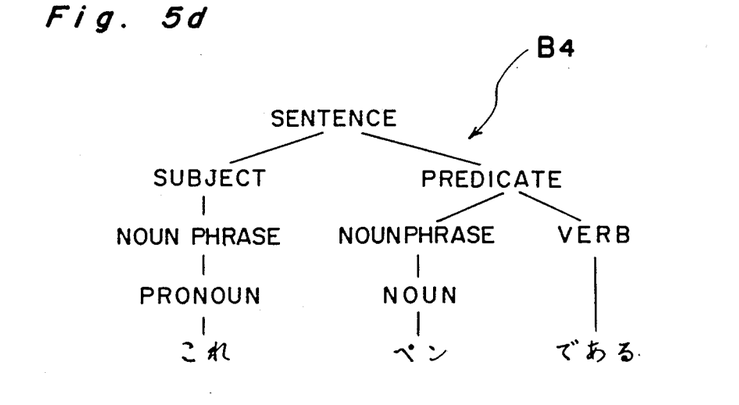

Then, in the semantic analysis process 53, the analysis is carried out in accordance with the conversion from the tree structure based on the English language to the tree structure based on the Japanese language in order to obtain a new tree structure, as shown in FIG. 5d, which is stored in buffer B4.

Figure 5E:
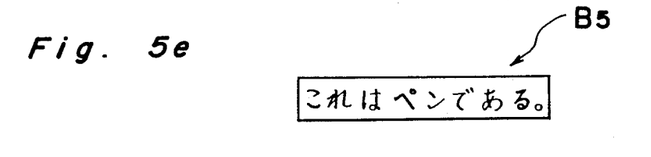

Thereafter, in the sentence generation process 54, postpositional words which function as an auxiliary to a main word, according to the Japanese grammar, are added to complete the translation into Japanese. The completed translation is stored in buffer B5 as shown in FIG. 5e, and is outputted from translation module 5.

Figure 6:
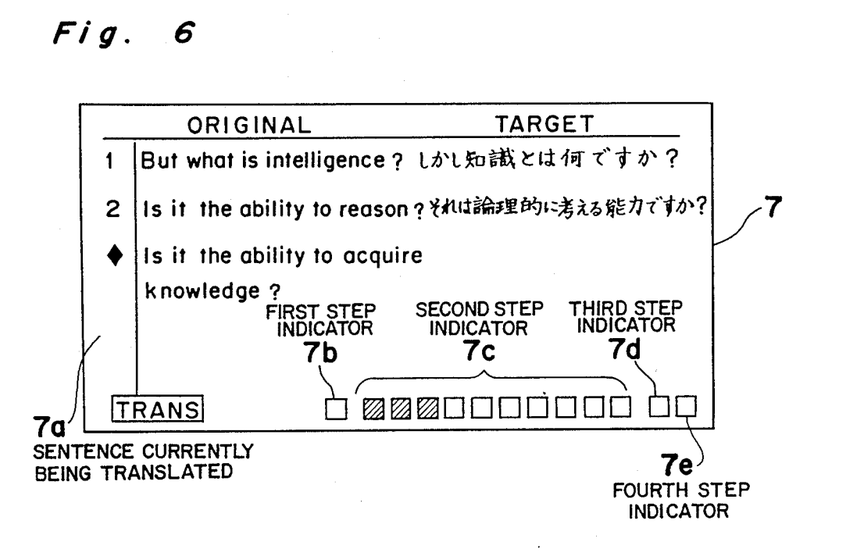
FIG. 6 is a plan view of a screen of the translation apparatus according to the preferred embodiment of the present invention.

Referring to FIG. 6, display 7 is shown in detail. On the left-hand side column of the display, the original language sentences, e.g., English sentences, are shown, and on the right-hand side column of the display, the target language sentences, e.g., translated Japanese sentences, are shown. The sentences are numbered, and a diamond mark 7a will appear on the number representing the sentence which is currently translated. At the bottom of the screen, an indication "TRANS" is produced while the translation is carried out. Also, a number of square indications are aligned which can be classified as a first step indicator 7b, second step indicators 7c, a third step indicator 7d and a fourth step indicator 7e. The first step indicator 7b is lit when the dictionary look-up process 51 is being carried out. The second step indicators 7c are sequentially lit from left to right in a predetermined, or set, time interval in order to indicate that the syntactic analysis process 52 is now being carried out. The third step indicator 7d is lit when the semantic analysis process 53 is being carried out, and the fourth step indicators 7e is lit when the sentence generation process 54 is being carried out.

Figures 7A, 7B:
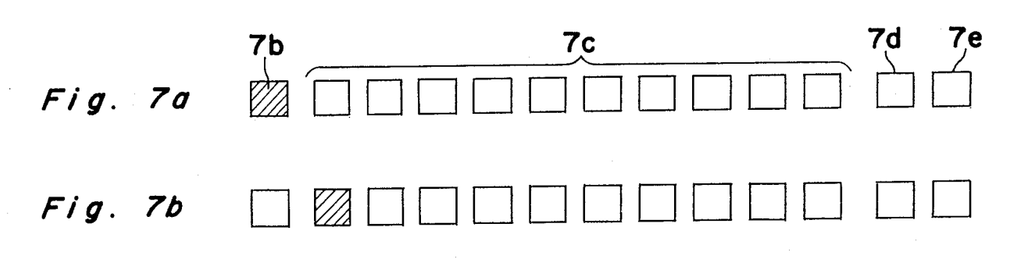
FIGS. 7a to 7g are schematic views showing the display of the step indicators.
Figure 7C:
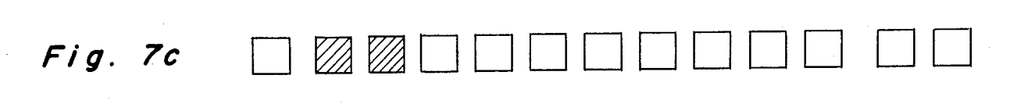
Figure 7D:
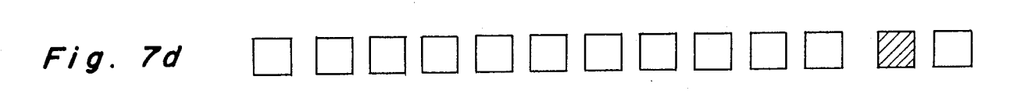
Figure 7E:
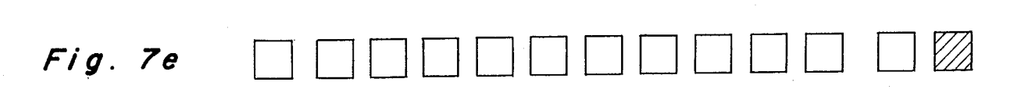
Figure 7F:
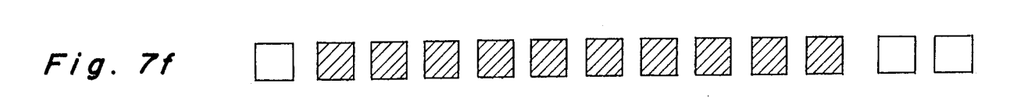
Figure 7G:
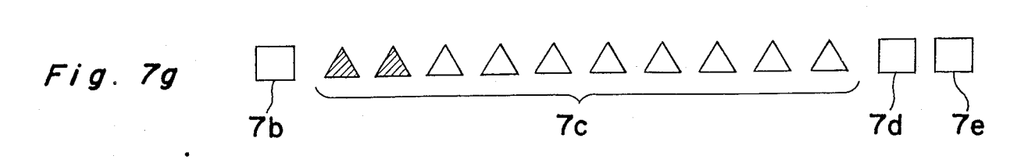

It is to be noted that the above described square indications are produced when the syntactic analysis is carried out under the basic mode. When the syntactic analysis is carried out under auto-division mode, the second step indicators 7c will be in a different shape, such as a triangle, as shown in FIG. 7g.

Figures 8, 8A:
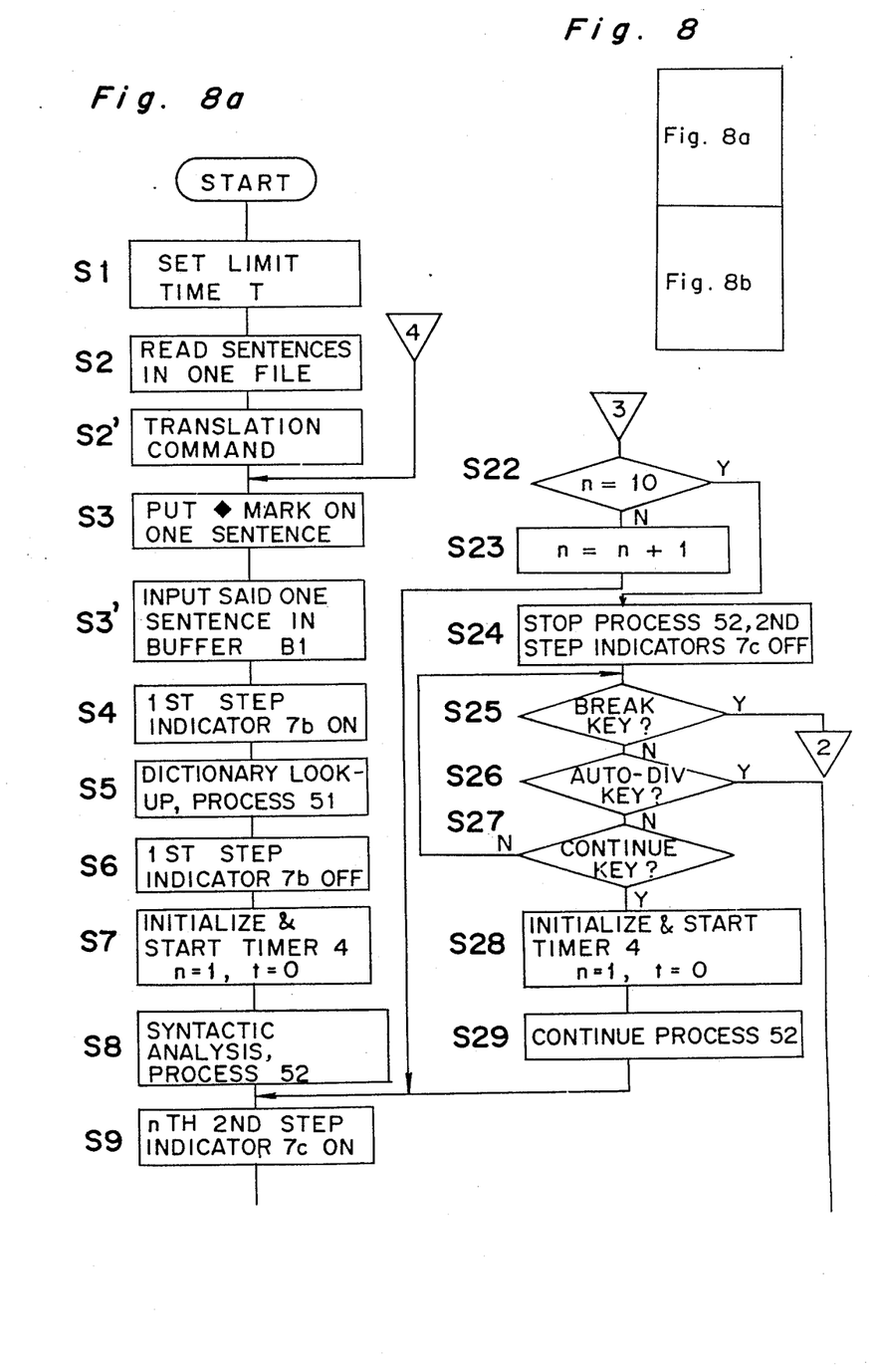
FIGS. 8a and 8b taken together as shown in FIG. 8 are flow charts showing the operation of the translation apparatus according to the preferred embodiment of the present invention.
Figure 8B:
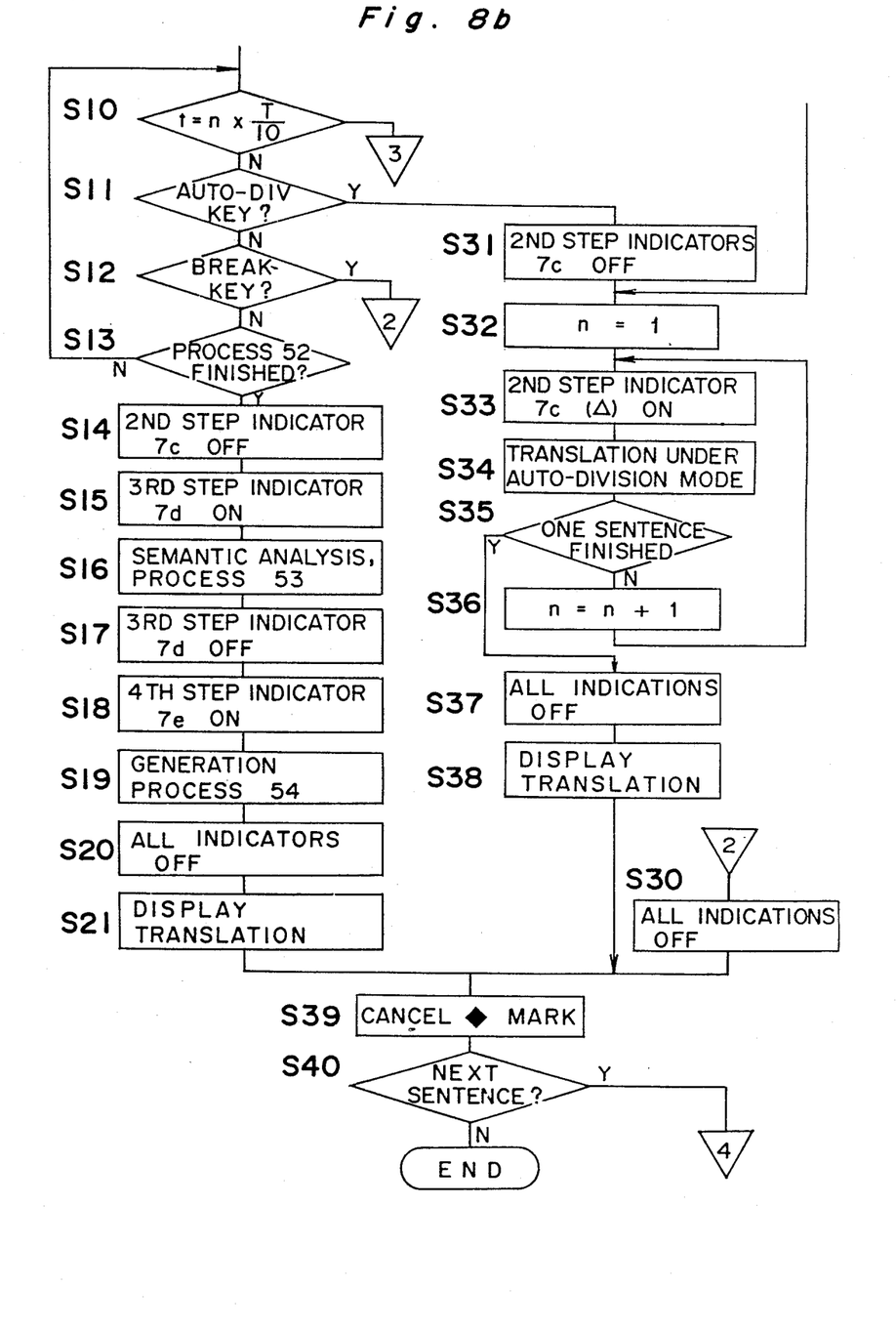

Next, the operation of the translation apparatus of the present embodiment will be described in connection with a flow chart that is shown in FIGS. 8a and 8b. At step S1, a maximum available time T for carrying out the syntactic analysis process 52 is set using timer set key 14 that is shown in FIG. 2. The maximum available time T may be set and fixed during the manufacturing of the translation apparatus. In such a case, step S1 may be omitted. At step S2, the sentences to be translated are read into one file in response to the operation of the read one file key 15 (FIG. 20. The sentences to be translated are previously stored of one file in the translation apparatus through the character keys or through any other known input, such as OCR. Then, at step 2', the translation starts in response to the translation commanded by the depression of translation key 10.

At step S3, the first sentence in the file includes the diamond mark 7a, and at step S3' the sentence with the diamond mark is inputted in buffer B1 for the dictionary look-up process 51. Then, at step S4, the first step indicator 7b turns on, as shown in FIG. 7a, and then, the dictionary look-up process 51 is carried out (step 5). When the dictionary look-up process 51 is completed, the first step indicator turns off (step S6).

At step S7, the timer in the timer circuit 4 is initialized (t=0) and starts counting the time, and at the same time, the counter in timer circuit 4 is set with one (n=1). Then, at step S8, the syntactic analysis process 52 starts and, at step S9, the nth indicator, in this case the first indicator, in the second step indicators 7c turns on, as shown in FIG. 7b.

Thereafter, in step S10, it is determined whether or not the counted amount t of the timer is now equal to $$n \times \frac{T}{10}$$

(n, which is an integer, is equal to the contents of the counter which is now "1"). At step S10, if $$t \neq n \times \frac{T}{10},$$

the program follows through steps S11 and S12 in order to determine whether or not either auto-division key 12 or break key 11 is depressed. If neither of the keys is depressed, the program goes to step S13 to detect whether or not the syntactic analysis process 52 is completed.

At step S10, if $$t = n \times \frac{T}{10},$$

the program goes to step S22 and it is determined whether or not the counter has counted up to the maximum 10, i.e., n=10. If the counter has not counted up to the maximum, the program goes to step S23 and increases the contents of the counter and then the program goes to step S9 to turn on the next indicator in the second step indicators 7c. For example, if the counter has counted up to "2", the step indicators will be shown, on the screen as in FIG. 7c. At step S22, if the counter has counted up to the maximum 10. meaning that the timer has counted up to the set maximum time T, the program goes to step S24 in order to stop the syntactic analysis process 52 and, at the same time, the second step indicators 7c are turned off. After step S24, the operator has three choices: stop the translation of the sentence being presently carried out as effected upon by the depression of the break key 11 at step S25; start the auto-division mode operation upon depression of the auto-division key 12 so that the syntactic analysis will be carried out by a section of one sentence at a time; or further continue the syntactic analysis of the same sentence for another maximum time T upon the depression of the continue key 13.

When the break key 11 is depressed at step S25, the program goes step S30 and turns off all the step indicators and further proceeds to step S39 and cancels the diamond mark 7a on the sentence which has been processing. Thereafter, it is detected at step S40 whether or not another sentence is in the file. If there are no more sentences in the file, the program ends, but if there is one or more sentences left in the file, the program returns to step S3 and starts the translation of the next sentence, which will be given with the diamond mark 7a.

It is to be noted that the translation can be stopped even during the translation under the basic mode by the depression of the break key 11. In this case, the program goes from step S12 to step S30.

When the auto-division key 12 is depressed at step S26, the program goes to step S32 where the contents n of the counter is made "1". Then, at step S33, a first indicator in the second step indicators 7c turns on. In this case, the shape of the indicator is changed to a triangle, as shown in FIG. 7g, for indicating that the syntactic analysis is now being carried out under the auto-division mode. At step S34, the analysis under the auto-division mode is carried out, the detail of which is disclosed in the above-mentioned prior application Ser. No. 66,549. Then, at step S35 it is determined whether or not the syntactic analysis under the auto-division mode is completed. If not, completed the program goes to step S36 to increase the counter and then returns to step S33 to carry out the translation under the auto-division mode. If the syntactic analysis under the auto-division mode is completed, the program goes to step S37 to turn all of the step indications off, and then to step S38 to display the translation result obtained under the auto-division mode. When the translation is performed under the auto-division mode and is compared with the translation performed under the basic mode, the former translation may be of a poor quality, but the former translation is advantageous because the translation can be obtained in a relatively short time. Thereafter, steps S39 and S40 are effected in the same manner described above for determining whether to end the translation program or to do the translation of the next sentence.

It is to be noted that the syntactic analysis under the auto-division mode can be started not only after the syntactic analysis under the basic mode has been carried out for the maximum available time T, but also at any time during the syntactic analysis under the basic mode being carried out. This analysis can be accomplished by the depression of the auto-division key 12 whenever it is desired. In this case, the program goes from step S11 to step S31 where the square shaped second step indicators 7c are turned off.

When the continue key 13 is depressed at step S27, the program goes to step S28 so that the timer in the timer circuit 4 is initialized (t=0) and starts counting the time, and at the same time, the counter in timer circuit 4 is set to one (n=1). Then, at step S29, the syntactic analysis process 52 continues and, thereafter, the program goes to step S9.

If the syntactic analysis under the basic mode is completed within the maximum available time T, the program goes from step S13 to step S14, where the second step indicators 7c are turned off. Then, at step S15, the third step indicator 7d turns on to indicate that the semantic analysis process 53 is carried out as effected in the next step S16. When the semantic analysis is completed, the third step indicator 7d will be turned off (step S17). Then, the fourth step indicator 7e turns on (step S18) in order to indicate that the sentence generation process 54 is carried out as effected in the next step S19. When the sentence generation process is completed, all of the step indicators are turned off (step S20), and the translation result obtained under the basic mode is displayed on the screen (step S21). Thereafter, steps S39 and S40 are effected in the same manner as described above for determining whether to end the translation program or to do the translation of the next sentence.

Although it is not shown in the flow chart of FIGS. 8a and 8b, the syntactic analysis under the auto-division mode can be forcibly stopped during step S34 upon depression of as the break key 11. In this case, all the step indicators are turned off.

Also, in the flow chart of FIGS. 8a and 8b, it may be so designed that, after steps S24, instead of giving three choices to the operator for depressing one of the keys 11, 12 and 13, the program continues from step S24 to step S32. Thereafter, the syntactic analysis under the basic mode is done for the maximum time T, and the syntactic analysis under the auto-division mode will start automatically.

The flow chart of FIGS. 8a and 8b is designed to carry out the translation under the transfer method with the analysis done up to the syntactic analysis.

Alternatively, the program may be designed to carry out the translation under the pivot method or the transfer method with the analysis proceeding up to different levels.

Although the present invention has been fully described in connection with the preferred embodiment thereof with reference to the accompanying drawings, it is to be noted that various changes and modifications may be apparent to those skilled in the art. Such changes and modifications are to be understood as included within the scope of the present invention as defined by the appended claims unless they depart therefrom.

What is claimed is:

1. A translation apparatus for displaying a translation for one of a plurality of original sentences into a target sentence and indicating an analysis state of the translation, comprising:

dictionary look-up and morpheme analysis means for finding word information corresponding to each word contained in the one original sentence;

syntactic analysis means for finding relationships of each said word contained in the one original sentence and determining at least one sentence construction;

semantic analysis means for developing one sentence construction determined in said syntactic analysis means having the best meaning;

translating means for generating the target sentence of said one sentence construction; and display means for displaying the original sentence, the target sentence and the analysis state of the translation including, sentence display means for displaying the plurality of original sentences, sentence indicator means for indicating the one original sentence that is translated, translation indicator means for indicating that the translation is being performed, first step indicator means for indicating only when the analysis state of the translation is performing said dictionary look-up and morpheme analysis means, second step indicator means for indicating only when the analysis state of the translation is performing said syntactic analysis means, third step indicator means for indicating only when the analysis state of the translation is performing said semantic analysis means, and translated sentence indicator means for indicating only when said translating means is generating the target sentence.

2. A translation apparatus as claimed in claim 1, further comprising:

timer means for counting to a predetermined maximum time in response to initiating said syntactic analysis means; and stop means for temporarily stopping said syntactic analysis when said timer means has counted to said predetermined maximum time.

3. A translation apparatus as claimed in claim 2, wherein said second step indicator means comprises a plurality of second step indicators which are turned on sequentially in response to said timer means.

4. A translation apparatus as claimed in claim 2, further comprising continuing means for continuing said syntactic analysis after being stopped by said stop means.

5. A translation apparatus as claimed in claim 2, further comprising auto-division analysis means for sequentially carrying out the syntactic analysis on a plurality of sections of said original sentence.

6. A translation apparatus as claimed in claim 1, further comprising break means for discontinuing the translation in response to the actuation of said break means.

7. A translation apparatus as claimed in claim 1, wherein said second step indicator means comprises a plurality of second step indicators for sequentially indicating the progression in time of said syntactic analysis means.

* * * * *